United States Patent
Figov

(10) Patent No.: US 7,416,297 B2
(45) Date of Patent: *Aug. 26, 2008

(54) PROCESS AND MATERIALS FOR MARKING PLASTIC SURFACES

(75) Inventor: Murray Figov, Ra'anana (IL)

(73) Assignee: Kodak IL Ltd., Petach Tikra (IL)

( * ) Notice: Subject to any disclaimer, the term of this patent is extended or adjusted under 35 U.S.C. 154(b) by 287 days.

This patent is subject to a terminal disclaimer.

(21) Appl. No.: 10/543,307

(22) PCT Filed: Dec. 16, 2003

(86) PCT No.: PCT/IL03/01072

§ 371 (c)(1),
(2), (4) Date: Jul. 26, 2005

(87) PCT Pub. No.: WO2004/069551

PCT Pub. Date: Aug. 19, 2004

(65) Prior Publication Data

US 2006/0125902 A1   Jun. 15, 2006

Related U.S. Application Data

(60) Provisional application No. 60/444,184, filed on Feb. 3, 2003.

(51) Int. Cl.
*B41J 2/01* (2006.01)

(52) U.S. Cl. ..................... 347/105; 347/102; 347/101; 347/100

(58) Field of Classification Search .................. 347/100, 347/105, 95, 96, 101, 102; 106/31.6, 31.27, 106/31.13; 523/160; 428/32.1, 195
See application file for complete search history.

(56) References Cited

U.S. PATENT DOCUMENTS

| 4,649,064 | A | | 3/1987 | Jones | |
|---|---|---|---|---|---|
| 4,732,786 | A | * | 3/1988 | Patterson et al. | ............ 428/32.1 |
| 4,966,804 | A | * | 10/1990 | Hasegawa et al. | ........ 428/195.1 |
| 6,025,068 | A | | 2/2000 | Pekala | |
| 6,312,858 | B1 | | 11/2001 | Yacobucci et al. | |
| 6,352,805 | B1 | | 3/2002 | Taylor et al. | |
| 6,443,568 | B1 | * | 9/2002 | Askeland et al. | ............ 347/101 |
| 2001/0036552 | A1 | | 11/2001 | Otani et al. | |

FOREIGN PATENT DOCUMENTS

| EP | 0 775 596 B1 | 5/1997 |
|---|---|---|
| JP | 52 142516 | 11/1977 |
| WO | 97/27053 A1 | 7/1997 |
| WO | 99/21724 | 5/1999 |

* cited by examiner

*Primary Examiner*—Manish S Shah
(74) *Attorney, Agent, or Firm*—Nelson A. Blish

(57) ABSTRACT

Single coatings onto non-absorbent substrates on which aqueous inkjet inks are jetted with subsequent application of heat or other forms of energy to further cross-link the coating onto the substrate and to fuse the inkjet ink image to give good quality water resistance colored reproductions. Optionally a protective layer is applied on the ink-jet printed image.

40 Claims, No Drawings

PROCESS AND MATERIALS FOR MARKING PLASTIC SURFACES

CROSS-REFERENCE TO RELATED PATENT APPLICATIONS

This patent application claims priority from and is related to U.S. Provisional Patent Application Ser. No. 60/444,184, filed 3 Feb. 2003, this U.S. Provisional Patent Application incorporated by reference in its entirety herein.

FIELD OF INVENTION

The present invention relates to methods and compositions for providing suitable substrate coatings for printing on plastic surfaces, specifically of containers, with aqueous ink jet inks.

BACKGROUND TO THE INVENTION

Packaging of all types of materials may require properties appertaining to functions involved in containing items and information about the use of such items. The container must have properties suited to the demands of the product. For instance, if the product is a liquid, then the container should be sealed to avoid spillage. If the liquid product is to be drunk, then the inside of the container must not contaminate the liquid nor cause its deterioration. Information of the product may be integral to the container or it may be separate. It may for instance have a function of aesthetically attracting a customer to the product or to instruct the customer how to use the product. As the product itself is generally what is being consumed, packaging provides an expense area that should perform its functions at a minimum cost. The printing of such packaging should have an optimum content of automation for this reason.

Modern technology has provided means of producing decorative and informative patterns of information on computers and it is desirable that this information be downloaded directly onto the packaging. One method of digital printing, which may be suitable for such applications, is inkjet. Inkjet is a non-impact printing process whereby ink is squirted through very fine nozzles and the resultant ink droplets form an image directly on a substrate. There are two main types of inkjet process. In one process, usually termed continuous inkjet printing (CIJ), a stream of ink drops are electrically charged and then deflected by an electric field either directly or indirectly onto the substrate. In the second process, usually called Drop on Demand (DOD) inkjet printing, the ink supply is regulated by an actuator such as a piezoelectric actuator. The pressure produced during the actuation forces a droplet through a nozzle onto the substrate. Inks for DOD inkjet printing do not need to be conductive.

WO 97/27053 by Jennel et al describes the use of inkjet to digitally write on packaging material. The printing can be done directly onto a pre-formed bottle such as one made from PET (polyester), or onto a carton blank or a web of packaging material. The invention is claimed to provide an advanced level of automation with minimum operator intervention. In order to achieve good adhesion to materials such as PET, ultra-violet (UV) sensitive inks are used and after jetting they are cured by UV radiation. The inkjet head is DOD and described as one supplied by the company Spectra. This is the most widely accepted way of using UV curing inkjet inks, as the alternative method, CIJ, generally uses water based inks and the inks must contain electrically conductive material. UV inks are generally based on organic acrylate mixtures that do not contain electrically conductive ingredients and are therefore less easily adapted for use in CIJ.

UV inkjet inks are more expensive than water-based inks and will remain so because by definition water-based inks contain a large quantity of water, which is relatively inexpensive. Because with UV inkjet inks all of the jetted material remains on the substrate surface (where the substrate is impermeable) inks are deposited in the form of tiny hemispherical structures. Process color work, where three or four separate inks are applied over the same area, can thus have a Braille-like feeling and such an effect limits print quality.

The use of water-based inks in packaging applications would be advantageous for several reasons. As has been mentioned above, they have cost advantages; they can be used in both DOD and CIJ inkjet systems and they do not pile-up because the major part of the inkjet drop is water, which disappears either by absorption, if the substrate is pervious, or by evaporation or both. However, there are a number of problems with using water-based inkjet inks in packaging. They have wetting problems with relatively low energy plastic surfaces (for instance that of PET) as well as slow drying, which for non-absorbent plastic surfaces has to occur only by evaporation. Also they have low wet smear resistance—i.e. after they have dried, they can be easily smeared with a wet finger. WO 99/21724 by Wang et als. addresses the problem of ink smearing. The patent application describes the use of two layers—an inner non-cross-linked hydrophilic coating and an outer cross-linked hydrophilic coating. In one embodiment, an inkjet image is applied before curing to avoid wet smear. Similarly, US 2001/0036552 by Otani et al. describes coating a substrate with two layers for water-based pigment inks to give better colors and image fastness.

It would be advantageous if a means could be found to produce a single coat for the substrate, which would be used to produce good quality water-fast images using aqueous inkjet inks.

SUMMARY OF INVENTION

This invention describes single coatings onto non-absorbent substrates on which aqueous inkjet inks are jetted with subsequent application of heat or other forms of energy to further cross-link the coating onto the substrate and to fuse the ink-jet ink image to give good quality water resistant colored reproductions.

In one aspect of the present invention, substrate coatings are described that are primarily designed for use in automated packaging. Such coatings are single layers and are initially hydrophilic, preferably turning hydrophobic after aqueous inkjet imaging and curing. The changing nature of the coatings on curing permits both the initial absorption of the aqueous inkjet ink into the coating, followed by the fixing of the ink into the cross-linked matrix, resulting in very high rub resistance and where the coating becomes hydrophobic water rejection of the entire surface.

In an alternative less automated embodiment, the substrate may be manufactured with the single hydrophilic coating. This substrate is then supplied to the customer who may then image it with aqueous inkjet ink followed by heating to further cross-link the coating and fix the inkjet ink. In such an application, the substrate together with its coating must be able to be handled and the coating itself must have a shelf life of at least several months to allow time for distribution and use.

DETAILED DESCRIPTION OF THE INVENTION

In a preferred embodiment, the application as designed for automation does not require the initial hydrophilic coating to be handled and therefore it may be of a fragile nature. As this is not the case with inkjet substrates as designed for non-automated systems, there is latitude in formulating such substrates, which is wider than usual. Generally, substrate coatings are subject to handling—whether during manufacturing, packaging of the coatings or in the actual imaging process. For instance, they may require resistance to absorption of moisture from fingers and this would therefore restrict the content of hydrophilic constituents in the coating. In the present application, such coatings, whilst having characteristics of a solid film, may have poor adhesion to the substrate until after imaging and curing, when excellent adhesion can be achieved. Also, the coatings may only have a "shelf life" of a matter of minutes, as they may be immediately used and processed as described herein. The coatings may be applied to a wide range of substrates, but are particularly suitable for plastics such as polyester (PET) and polyvinyl chloride (PVC). The coating may be pigmented or transparent, depending on the application. A substrate with a white pigment, either Incorporated therein or incorporated in the substrate coating, has wide application as it provides an essential background for transparent process inks. In the case of a coating, it can be applied to a designated area of the substrate and the inkjet inking can be used in just this area. This Is particularly useful for bottles of drink where the color of the drink can be seen through the transparent parts of the bottle and the bottle can still have an attractive aqueous inkjet image affixed to a white area provided by the substrate coating.

It is preferable but not essential to deposit the substrate from aqueous solution.

It is also preferable, depending on the application, that the substrate materials are chosen from only those approved for food items, making their use in the food and drink industry applicable.

The method of application as applied to an automated production line is as follows:

apply the solution of substrate coating to the plastic surface;

air-dry to evaporate the water or solvent;

apply the aqueous inkjet inks in the form of the required image; and treat with heat or another form of energy to cross-link and fix the inkjet image into the substrate.

This method will be referred to below as the "automated" method.

In the less automated form, the substrate coating and initial drying may be done as a manufacturing process for supplying the coated substrate to a customer. The customer will then image the coated substrate with the aqueous inkjet inks and cross-link them to produce the finished item. This method will be referred to below as the less automated method.

Both above described methods can be applied not only to bottles and other packaging items, but also to other inkjet applications such as printing on credit cards, smart cards etc. If necessary, a laminate or protective layer can be applied for extra protection against surface damages.

It is part of the invention that the color quality of the inkjet image is retained or achieved after the applied energy finishing stage has been completed to finalize the cross-linking process. Aqueous inkjet inks may be based on dye colorants or pigments and may contain technologies to enhance drying and wet strength. Thus, although, with some aqueous ink formulations it may be possible to insolubilize them on uncoated plastic substrate, because of surface energy considerations, image quality may be lost completely as the inks often reticulate on plastic surfaces.

Suitable substrate coating formulations may be water-based mixtures of polyvinyl alcohol and polyacrylic acid together with a water based emulsion containing a hydrophobic polymer in the internal phase and stabilized at a pH of 7 or less. In addition, a water-soluble cross-linker such as an aminoplast is used together with a catalyst. In the embodiments where the coated substrate is manufactured prior to subsequent final inkjet imaging and thus must have shelf life, the catalyst should be one only activated when energy is applied. An example of a suitable catalyst is an amine hindered para toluene sulfonic acid.

In all of the above applications, the mixture can also contain titanium dioxide or a mixture of white or opaquing pigments dispersed therein. Mixtures of use in this invention, when deposited on a plastic substrate can be dried with warm air and give solid films. Deposition may be by spraying or by any other suitable means of coating.

Suitable formulations may be also solvent-based mixtures of cellulose derivatives such as hydroxypropyl cellulose, which may be deposited from solvent mixtures such as alcohol/ethyl acetate mixtures. The formulation should contain solvent soluble aminoplast cross-linkers and appropriate catalysts. They may be deposited and treated in a similar fashion to the water based coatings and can be used for the automated or less automated applications.

A third type of formulations may be based on pre-polymeric mixtures that in the presence of photo-initiators can be polymerized by ultra-violet light. In order to achieve the initial hydrophilic properties, suitable hydrophilic polymers and extenders may be added. It is also important to arrive at a solid film before the deposition of the inkjet inks. This type of formulation can also be used for both the automated and the less automated applications.

The following examples illustrate the processes as described. All formulations are given by weight.

EXAMPLE I

| | |
|---|---|
| Polyvinyly alcohol solution (12% in water) | 22.4 |
| Deionized water | 115 |
| Polyacrylic acid (35% in water) | 32 |
| Super Wetting Agent (Q2-5211 Manufactured by Dow Corporation, Midland, MI, USA) | 4 |
| Walpol 40-136 Vinyl-acrylic latex polymer (Reichold Inc., Research Triangle Park, NC, USA) | 37 |
| Cymel UFR-60 Methoxymethyl methylol urea by Cytec Industries, Five Garret Mountain Plaza, West Patterson, NJ, USA) | 13.5 |
| Cycat 4045 (amine inhibited toluene sulfonic acid) Cytec Industries, Five Garret Mountain Plaza, West Patterson, NJ, USA) | 8 |

The above-enumerated mixture was made up and high-speed stirred. A 175-micron polyester loaded with barium sulfate to give a white opaque appearance was used as the substrate. This was coated with the above formulation solution using a Mayer rod and the coating was air dried overnight at room temperature. The film formed on the polyester had a coating weight of approximately 2.6 grams per square meter. This was passed through an Epson 7600 and a colored image using aqueous pigment-based "Ultrachrome" inks was deposited on the coating. The resulting print was then heated for 4 minutes at 140° C. and gave a high quality water-fast reproduction.

EXAMPLE II

| | |
|---|---|
| Polyvinyly alcohol solution (12% in water) | 22 |
| Deionized water | 111 |
| Polyacrylic acid (35% in water) | 35 |
| Super Wetting Agent (Q2-5211 Manufactured by Dow Corporation, Midland, MI, USA) | 4 |
| Walpol 40-136 Vinyl-acrylic latex polymer (Reichold Inc., Research Triangle Park, NC, USA) | 37 |
| Cymel UFR-60 Methoxymethyl methylol urea by Cytec Industries, Five Garret Mountain Plaza, West patterson, NJ, USA) | 14 |
| Cycat 4045 (amine inhibited toluene sulfonic acid) Cytec Industries | 8.6 |
| Kronos 2065 (Kronos Inc. Huston, Texas, USA) | 53.8 |
| Ethanol | 80 |

The above-enumerated mixture was made up and ball-milled overnight. A 175-micron transparent polyester was used as the substrate. This was coated with the above formulation solution using a Mayer rod and the coating was air dried overnight at room temperature. The film formed on the polyester had a coating weight of approximately 8.7 grams per square meter. This was passed through an Epson 7600 and a colored image using aqueous pigment-based "Ultrachrome" inks was deposited on the coating. The resulting print was then heated for 4 minutes at 140° C. and gave a high quality water-fast reproduction.

EXAMPLE III

| | |
|---|---|
| Glasscol C44 (styrene/acrylic copolymer emulsion sold by Ciba Speciality Chemicals, Macclesfield, UK)) | 8.7 |
| Water | 15.7 |
| BYK 346 (surfactant sold by BYK-Chemie GmbH, Postfach, Germany. | 0.3 |
| Polyvinyl alcohol solution (12% in water) | 2.0 |
| Kronos 2065 (titanium dioxide sold by Kronos Inc., Huston, Texas, USA | 6.6 |
| Cabosil M5 (Untreated fumed silica sold by Cabot Corporation, Tuscola, IL, US) | 0.94 |
| The above enumerated mixture was made up with stirring after each addition and ball-milled overnight. | |
| 5 grams of the above mixture was then mixed with the following ingredients: | |
| Water | 3.2 |
| UFR-60 (aminoplast by Cytec Industries, West Patterson, NJ, USA) | 0.86 |
| Cycat 4045 (catalyst by Cytec Industries, West Patterson, NJ, USA.) | 0.19 |

The final mixture was coated on a 175-micron clear polyester film. The coating mixture was applied using a wire wound rod and was dried at 110° C. for 4 minutes to a dry weight of approximately 12 grams per square meter. The sheet was then imaged in an Iris Realist 2-Print proofer which uses dye based aqueous inks with a full process color image. The print was warmed for one minute at 110° C. and then coated with the following solution:

| | |
|---|---|
| Daotan VTW 6462 w/36WA(self-cross-linking aliphatic urethane acrylate hybrid sold by Solutia, St. Louis, MO, USA.) | 14.5 |
| BYK 346 | 0.14 |

The coating mixture was applied with a wire rod and cured in the oven at 140° C. for 4 minutes. The dry weight of the over-coat was approximately 5 grams per square meter. Although the coating was applied to the dried dye-based aqueous inks by pressing the wire rod in contact with the surface, surprisingly no bleeding nor smudging was observed either during coating or during drying/curing. The resulting print was high gloss and high solvent resistance. For instance, the finished print was soaked for 24 hours in 70% by weight isopropanol (25% water). After drying, the print showed no damage and could be rubbed without effecting the material and image. Other emulsion top-coats were used. It was found that self cross-linking urethane acrylate hybrids gave the best solvent resistance.

EXAMPLE IV

The mixture of Example III was made up with one difference. Cycat 4045 was replaced by Cycat 4040 (Cytec Industries)—a toluene sulfonic acid solution that acts as a catalyst for cross-linking amoniplasts. The mixture was sprayed onto a PET bottle to give an even coating of approximately 12 grams per square meter. The bottle was air-dried at ambient conditions and provided a white opaque ink jet receptive surface. It was then imaged using a Iris ink jet heads mounted on a lathe with the bottle fixed to rotate close to the ink jet heads. A good quality image was obtained and this was warmed with an air gun to dry the image. It was then sprayed with the overcoat of Example III and again dried with the air gun. No image bleeding was observed. The bottle was immediately scuff resistant but was left for a week during which the undercoat continued to harden by means of the aminoplast cross-linking with the polyvinyl alcohol in the presence of the toluene sulfonic acid catalyst.

EXAMPLE V

The following formulation was made up by weighing out each ingredient into a bottle in the order shown and stirring the mixture after each addition;

| | |
|---|---|
| NeoRad R-440 (Aliphatic urethane water dispersion by Avecia, Neoresins, Wilmington, MA, USA.) | 110 |
| Escacure KTO46 (photoinitiator mixture by Lamberti s.p.a. Produti Chimici, Gallarate VA, Italy) | 3.2 |
| Starch | 4.8 |
| PVP-K15 (polyvinyl pyrollidone by ISP Europe, Surrey, England) | 4.8 |
| BYK 346 | 2.2 |
| Ti-Pure 746 (Titanium dioxide dispersion by Titanium Technologies, Wilmington, DE, USA) | 1.6 |
| Ludox TM-40 (colloidal silica - 40% in water sold by Sigma-Aldrich Chemical Company, Milwaukee, USA) | 80.6 |
| Glasscol C44 | 11.1 |

The completed mixture was stirred and then coated onto a 175-micron white polyester and dried at 110° C. for a minute, to a dry thickness of approximately 12 grams per square meter.

The coated polyester was imaged with a multicolored image through an Epson C82 Stylus ink jet printer. The image was warmed (1 minute at 110° C.) to drive any water either into the coating or away from the coating by evaporation as well as to drive humectants in the inks into the coating. The imaged material was then further coated with a 100% solids UV-sensitive lacquer and the entire composite subject to UV light to cure both the undercoat and the overcoat, as well as to fix the image firmly within the system. Alternatively, the UV lacquer was omitted and the imaged material was UV cured to cross-link the entire coating, trapping within the coating the dried ink jet inks.

The invention claimed is:

1. A method of producing ink-jet printed images on plastic surfaces, comprising the steps of:
   a. providing a plastic object;
   b. coating at least part of the surface of the plastic object with a mixture containing a chemically cross-linkable system;
   c. evaporating off the volatile part of the mixture, thus depositing a solid hydrophilic layer on the surface of the plastic object without causing the coating to cross-link;
   d. providing an ink-jet ink comprising a non-reactive colorant and aqueous carrier;
   e. jetting the ink by means of an ink-jet system onto the surface of the coating on the plastic object so that it is absorbed into the coating;
   f. providing energy in sufficient quantity to the printed surface to cross-link the entire surface coating including the absorbed ink-jet inks to form a non-smearable print.

2. The method according to claim 1, wherein the coating mixture is water-based.

3. The method according to claim 2, wherein the coating mixture comprises polyacrylic acid polymer, and a hydrophobic resin emulsion with a pH of less than 7, together with a cross-linking substance.

4. The method according to claim 3, wherein the hydrophobic resin emulsion contains an acrylic polymer or co-polymer.

5. The method according to claim 2, wherein the coating mixture includes one of polyvinyl alcohol and hydroxy-alkyl cellulose.

6. The method according to claim 2, wherein the cross-linkable system comprises a water-soluble amino-plast.

7. The method according to claim 6, wherein the coating mixture contains cross-linking catalyst.

8. The method according to claim 6, wherein the cross-linking catalyst is latent and is released during the post-imaging heating stage.

9. The method according to claim 1, wherein the coating mixture contains a mixture of hydrophilic polymers and hydrophobic polymers.

10. The method according to claim 1, wherein the plastic is one of polyester, polyvinyl chloride, polyethylene and polypropylene.

11. The method according to claim 1, wherein the hydrophilic layer becomes hydrophobic after ink-jet imaging and cross-linking.

12. The method according to claim 1, wherein the ink-jet ink colorant is one of a dye and a pigment.

13. The method according to claim 1, wherein the coating includes a pigment.

14. The method according to claim 13, wherein the pigment is white.

15. The method according to claim 14, wherein the white pigment is titanium dioxide.

16. The method according to claim 1, wherein the coating is transparent.

17. A plastic object coated and imaged according to the method of claim 1.

18. A plastic object according to claim 17, wherein said object is one of a card and a bottle.

19. The method according to claim 1, wherein the volatile portion of the coating mixture is non-aqueous.

20. The method according to claim 19, wherein the non-aqueous coating mixture comprises:
   organic solvent-based mixtures;
   polyacrylic acid;
   a cross-linkable resin;
   a catalyst; and
   a hydrophobic polymer.

21. The method according to claim 20, wherein said non-aqueous mixture additionally comprises a solvent soluble hydroxyl alkyl cellulose.

22. The method of claim 21, wherein the cross-linkable resin is one of an aminoplast and a phenol-formaldehyde resin.

23. The method of claim 21, wherein the hydrophobic polymer is an acrylic thermoplastic polymer or co-polymer.

24. The method of claim 20, wherein the cross-linkable resin is one of an aminoplast and a phenol-formaldehyde resin.

25. The method of claim 20, wherein the hydrophobic polymer is an acrylic thermoplastic polymer or co-polymer.

26. The method according to claim 1, additionally comprising the steps of:
   coating the imaged layer with an over-coating mixture; and
   heating said over-coated surface to remove carrier liquid and cause cross-linking, to form a protective over-layer film.

27. The method of claim 26, wherein the additional over-coating mixture is a water-based emulsion and the heating step removes the water.

28. The method of claim 26, wherein the additional over-coating layer is a water-based cross-linkable mixture and the heating step removes water and cross-links said over-coating.

29. The method of claim 28, wherein said mixture is an emulsion.

30. The method of claim 26, wherein said over-coating mixture comprises:
   water-soluble amino-plasts and acid catalysts.

31. The method of claim 26, wherein said over-coating mixture comprises:
   water-based emulsions.

32. The method of claim 26, wherein said over-coating mixture comprises a water-based emulsion and a cross-linking agent.

33. The method of claim 26, wherein the entire process comprises a single automated composite action, to the extent that at no stage involves human handling.

34. The method according to claim 26, wherein the coating is prepared industrially and supplied in sheet form for imaging and over-coating by the user.

35. A plastic card or bottle coated and imaged according to the method of claim 26.

36. The method of claim 1, wherein said coating mixture additionally comprises a mixture of white or opaqueing pigments dispersed therein and fillers.

37. The method of claim 1, wherein the entire process comprises a single automated composite action, to the extent that at no stage involves human handling.

38. The method according to claim 1, wherein the coating is prepared industrially and supplied in sheet form for imaging and over-coating by the user.

39. A translucent or transparent bottle, imaged according to the method of claim 1, wherein said ink-jet image comprises a color image, additionally comprising a white under-layer, said color image viewable without influence of any contents of said bottle.

40. A method of producing ink-jet printed images with high resistance to physical and chemical damage on plastic surfaces, comprising the steps of:
 a. providing a plastic object;
 b. coating at least part of the surface of the plastic object with a solution containing a mixture of a hydrophilic polymer or polymers together with a hydrophobic polymer;
 c. evaporating off the volatile part of the coated solution, thus depositing a solid film on the surface of the plastic object;
 d. providing an ink-jet ink comprising a colorant and aqueous carrier;
 e. jetting the ink by means of an ink-jet system onto the surface of the coating on the plastic object;
 f. warming the printed surface to drive part of the water in the ink into the surface coating and to evaporate the other part of the water, as well as causing cross-linking of the deposited layer;
 g. over-coating the dried surface with a water-based coating; and
 h. heating the over-coating to seal-in the previously deposited ink and coating.

* * * * *